United States Patent
Scheublein, Jr. et al.

[15] 3,675,941
[45] July 11, 1972

[54] VEHICLE STABILITY CONTROL DEVICE

[72] Inventors: William A. Scheublein, Jr., Ballwin; Louis P. Fister, St. Louis, both of Mo.

[73] Assignee: Moog Industries, Inc., St. Louis, Mo.

[22] Filed: June 29, 1970

[21] Appl. No.: 50,518

[52] U.S. Cl. ............................................. 280/124 R, 267/58
[51] Int. Cl. ....................................................... B60g 11/14
[58] Field of Search ................... 267/58, 59, 60, 155, 156, 20; 280/124

[56] References Cited

UNITED STATES PATENTS 1,048,510  12/1912  Eastman ................................. 267/59
2,923,961  2/1960  Black .................................. 267/58 X

FOREIGN PATENTS OR APPLICATIONS 5,611  3/1906  France ................................. 267/58

Primary Examiner—Philip Goodman
Attorney—Gravely, Lieder & Woodruff

[57] ABSTRACT

A resilient control device for stabilizing the road and load response of a vehicle as well as being useful as the main suspension means for certain vehicles. The device has the characteristics of resisting movement in opposite directions from an initial relationship of the sprung and unsprung components of a vehicle, as well as imposing a desired rate of load carrying capacity.

7 Claims, 12 Drawing Figures

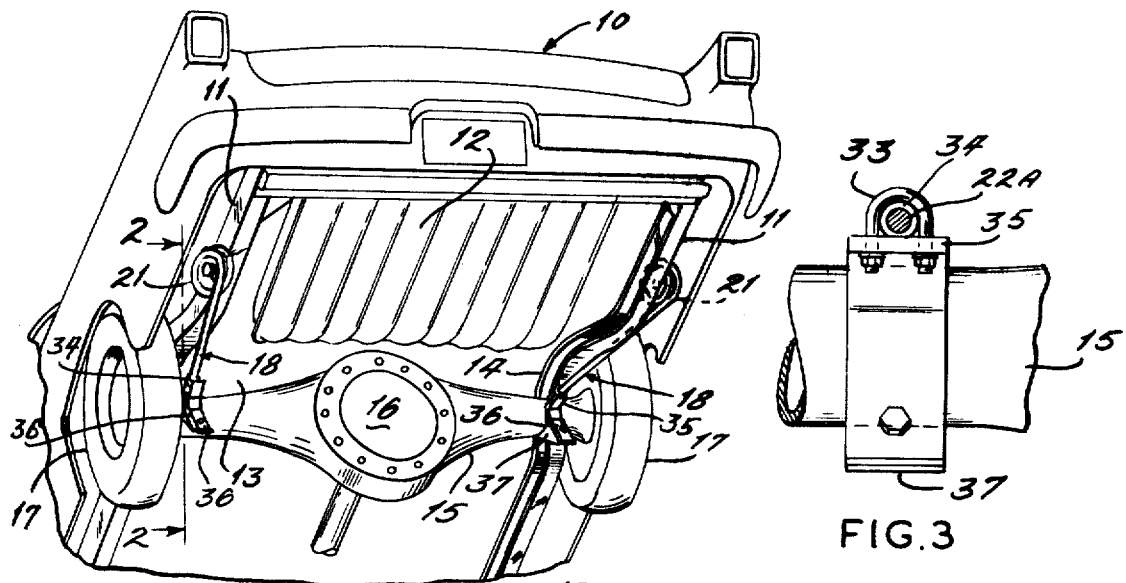
FIG.1
FIG.3
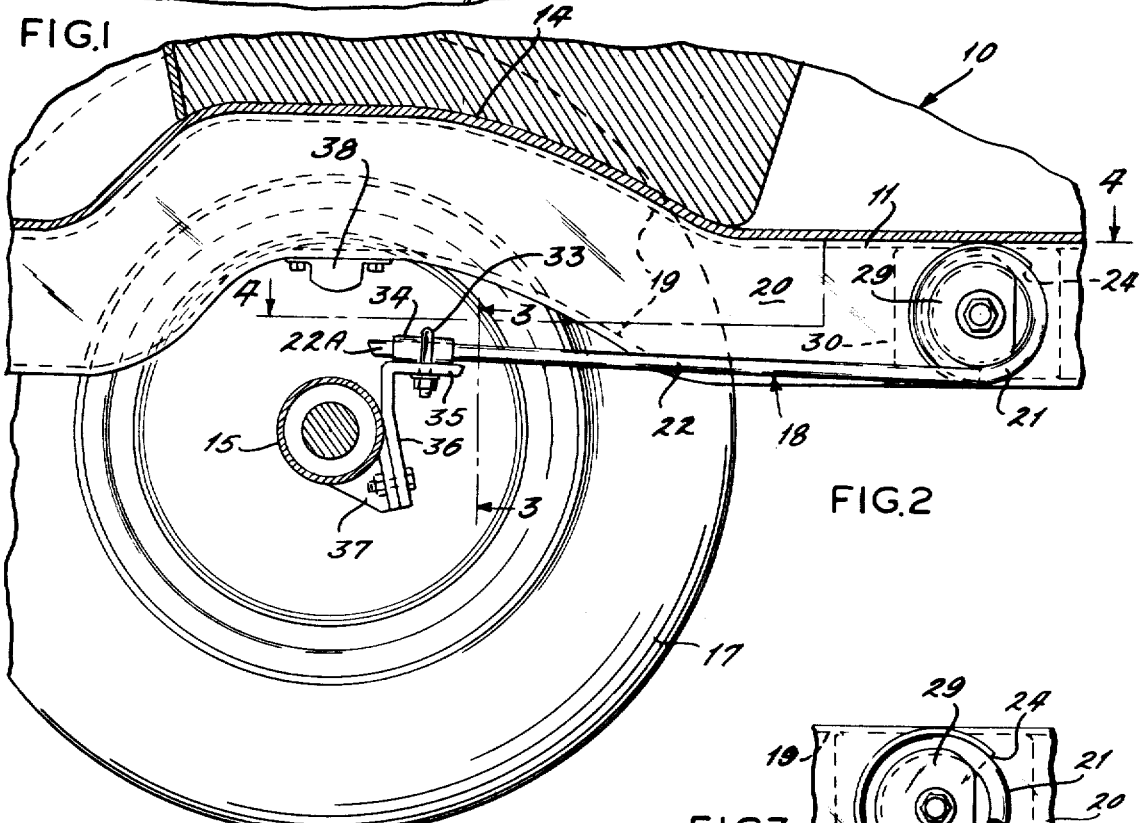
FIG.2
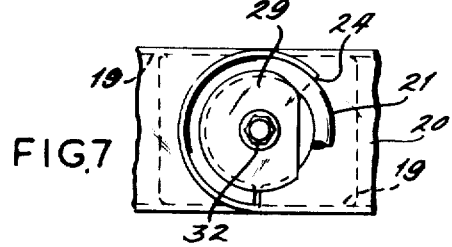
FIG.7

VEHICLE STABILITY CONTROL DEVICE

THE PROBLEMS OF THIS ART

The great variety and assortment of vehicles spawned by the different needs has no easy answer as to the suspension system to be used. Campers, high body vehicles, light weight carrying trailers, are just some of the types of vehicles. In some the suspension is set at or near neutral when the vehicle is loaded, while others have special requirements related to the use factors. Passenger carrying vehicles are generally made to have a soft ride, and the prevailing suspension systems which give a soft ride incorporate coil springs between the sprung and unsprung components. It is recognized that coil springs do not possess lateral resistance to the same degree as leaf springs and the result is that coil spring suspension systems allow the vehicle body to wobble laterally in response to load distribution and road surface conditions, as well as other conditions.

Many attempts have been made to solve the problem of wobble or lateral sway in vehicles, and this is not limited to people-carrying vehicles. Most solutions in the form of overload devices have failed due to unidirectional characteristics. It has been recognized that coil or leaf overload devices, or air lift means, only minimize the problem by resisting excess loading by which the devices try to maintain the original load heighth of vehicles. However, such devices do not possess the ability to check rebound, but work to accentuate the rebound reactions. Due to this reaction, the damping function of the usual shock absorbers becomes less effective and actually results in greater wheel vibration amplitude so the wheels leave contact with the road surface more frequently. Control of the vehicle is more difficult and the objective of controlling the vehicle stability is defeated.

BRIEF DESCRIPTION OF THE INVENTION

The present stability control device consists of a torsion type coil spring having active and inactive coil portions and a working arm. The inactive portion of the coil normally is secured to the vehicle frame and the working arm normally is engaged with the axle or other unsprung component. The device embodies the mechanical characteristic of resisting both positive and negative vertical and lateral motions. The principle is to arrange the active portions of the coil of the device so it will be able to resist pulling and pushing forces in all directions. Varying the coil diameter, the bar diameter, the number of coil turns and length of the working arm will make it possible to obtain a desired rate and load carrying capacity.

As the vehicle travels on a rough road surface, the present device acts as a combination tension and compression spring. When the vehicle body tends to move down from its normal static heighth the device will resist this movement and try to push or lift the body back to its static position. It therefore works together with the main suspension spring and the shock absorber. On the other hand, when the vehicle body tends to rise above the static position the device resists and tries to pull the body back. The result is that the device works with the shock absorber and against the main suspension spring. This is a desirable condition since the vertical movement of the wheel will be reduced and the tire will not break contact with the road as frequently or as quickly.

During braking action of self-propelled vehicles the body tends to nose down and the rear rises. The present device will resist the diving action by pulling down on the rear end to keep the body close to its normal static position. When the vehicle moves through a curve the body tends to move laterally to the outside of the curve, but the present device resists the lateral movement and thereby stabilizes the body sway.

BRIEF DESCRIPTION OF THE DRAWINGS

The invention is embodied in preferred and modified arangements, the same being seen in the accompanying drawings, wherein:

FIG. 1 is a perspective view from the under side of the rear end of a passenger vehicle showing a preferred installation of the present control device;

FIG. 2 is a greatly enlarged and fragmentary sectional view of a vehicle equipped with the present device, the view being taken at line 2—2 in FIG. 1;

FIG. 3 is a fragmentary view taken at line 3—3 in FIG. 2;

FIG. 7 is a fragmentary view, on a reduced scale, of the coil mounting means seen from the side opposite to the view of FIG. 6;

DESCRIPTION OF THE CONTROL DEVICE

Figure 4:
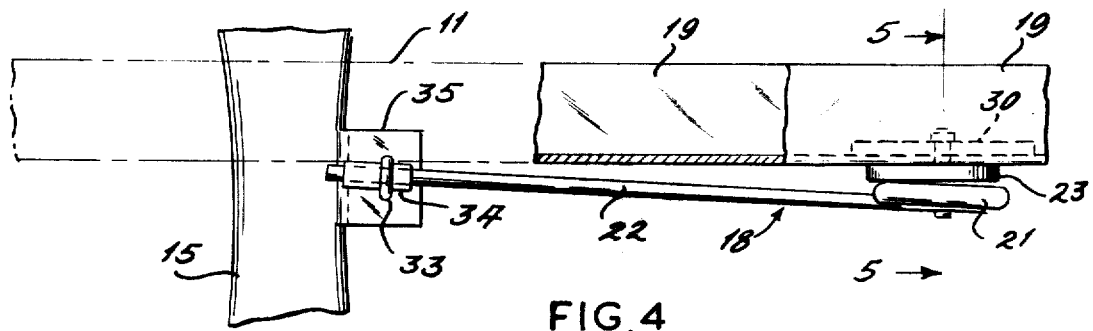
FIG. 4 is another fragmentary view taken at line 4—4 in FIG. 2.

In the view of FIG. 1, the body 10 of the passenger vehicle is provided with longitudinal frame members 11 which run along the respective sides of the body 10 from the usual vehicle overhang at its rear end. The usual fuel tank 12 is suitably suspended adjacent the body floor pan 13. Each frame member 11 is formed with an arched portion 14 in order to make necessary room for receiving the rear axle housing 15 and differential 16 in operative position for normal vertical movement. The usual coil rear springs have not been illustrated so that the drawing will not be overly complicated. Wheel and tire assemblies 17 are mounted on the outer ends of the axle housing 15 in the usual manner.

Figure 5:
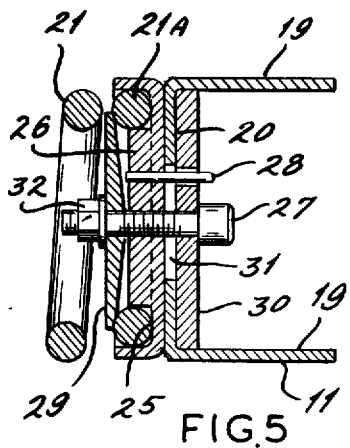
FIG. 5 is an enlarged view of the coil mounting means for the present device, the view being taken at line 5—5 in FIG. 4.
Figure 6:
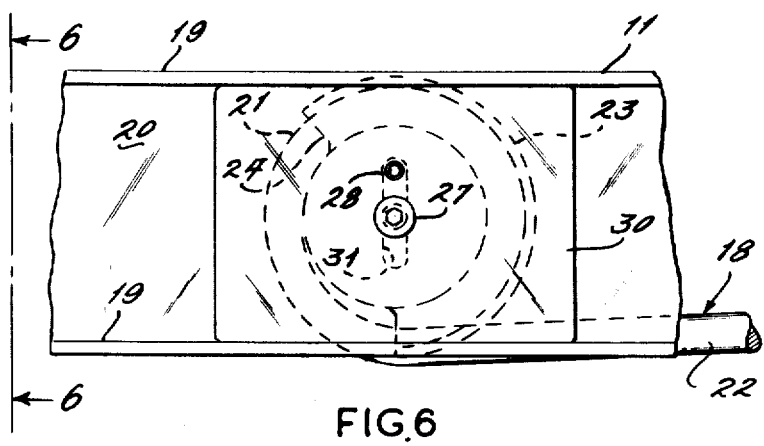
FIG. 6 is a further view taken at line 6—6 in FIG. 5.

Stability control devices 18 of this invention are mounted adjacent each of the frame members 11 so as to extend rearwardly from the axle housing 15. In the present vehicle, the devices 18 are located at the outside of the frame members 11, and the rear overhang portion of each frame member (FIG. 5) is in the form of a channel section having its flanges 19 directed inwardly and its web 20 directed vertically.

It can be seen in FIGS. 2, 4, 5, 6 and 7 that the left hand device 18 of FIG. 1 comprises a spring coil 21 having a plurality of turns and a working arm 22 extending from the coils toward the axle housing 15. The base turn 21A (FIG. 5) of the coil 21 is seated in a base cup 23 having a rim interrupted at the gap 24 (FIG. 6) such that the seat groove 25 opens out through a gap space of more than 90° of arc. The central land 26 of the cup 23 is formed with an aperture for the clamping bolt 27 and a second aperture is off set from the bolt aperture to receive a key element 28. A clamp plate 29 retains the base coil 21A in secure position so that it may not turn or slip in the groove 25. When mounting the base cup on the outer surface of the web 20 for the frame member 11, the bolt 27 is inserted from the inside between the flanges 19 first through an anchor plate 30 and then through a slot 31 in the frame web. The cup 23 is fitted over the projecting bolt, the base coil 21A is fitted in its groove 25, and the clamp plate 29 is then secured by a nut 32. The anchor plate 30 is dimensioned to seat firmly between the flanges 19 and against the web 20. The key element 28 is inserted to lock the cup 23 against turning once the nut 32 is tightened down. When fully mounted at least one complete turn of the coil 21 is free to respond to motion of the arm 22.

The arm 22 (FIGS. 2, 3 and 4) extends toward the axle housing 15 where its end portion 22A is engaged by a U bolt 33 after a suitable sleeve bushing 34 has been fitted over the end of the arm. The U bolt 33 has its legs inserted in apertures in the leg 35 of an attachment bracket 36. The bracket 36 is bolted to a suitable lug 37 fixed on the axle housing 15. This mounting assembly is best seen in FIG. 2. Care is used to avoid having the end portion 22A interfere with the path of travel of the usual strike through bumper 38 carried on the frame arch 38 in position to engage the axle housing 15.

In effecting the mounting of the control device 18, the vehicle is established at its normal static or loaded heighth. The arm portion 22A is seated on the bracket leg 35, and the coil 21 is then clamped in position so the key element 28 retains the coil 21 with neutral force on the arm 22. Thereafter the U bolt is secured to hold the arm end portion 22A in position to be able to move longitudinally when required. When assembled in this manner the device 18 is conditioned to resist both up and down movement of the frame 11 relative to the axle housing 15. The U bolt 33 also retains the arm 22 so that lateral movement of the frame member 11 relative to the axle housing will be resisted by the arm 22 and the coil 21 in combination.

A description of the device 18 for the right side (FIG. 1) is believed unnecessary as it follows the same assembly procedure set forth above. The adjustment for each device 18 must be similar so that there is equalization of operation to resist vertical as well as lateral motion.

When it is desired to initially apply a load, either positive or negative, on arm 22, the coil 21 is turned with its base cup 23 the required angular amount before being clamped and anchored by the key element 28. If the body 10 requires some initial lift above its static position, the coil 21 is turned so the arm 22 wants to move below the leg 35. This establishes a working relation in which the arm 22 wants to move down to relieve itself of the stress and its reaction lifts the frame member 11. The body 10 may also be pulled down below its static position by reversing the foregoing installation steps so the arm 22 must be pulled down to be secured on the bracket leg 35.

Figure 8:
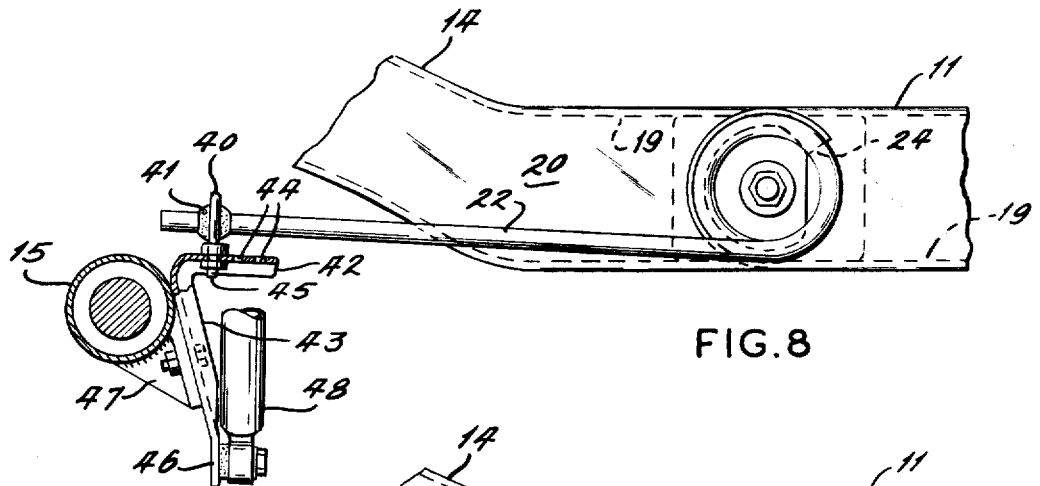
FIG. 8 is a modified embodiment of the present device.

In FIG. 8 the device 18 is assembled with its arm portion 22A engaged in an adjustable eye bolt 40, a bushing 41 being inserted in the eye of the bolt. In this modification the plate 42 of the bracket 43 is provided with a plurality of apertures 44 so the shank 45 of the eye bolt 40 may be positioned to shorten or lengthen the effective length of arm 22. Also, the bracket 43 may be extended at 46 below the anchor lug 47 on axle housing 15 to provide a point of attachment for the lower end of a shock absorber 48. In other respects the parts of the device 18 are similar to those described in FIG. 2, and in each view the length of the shank on the eye bolt may be varied to provide a further adjustment for the arm 22.

Figure 9:
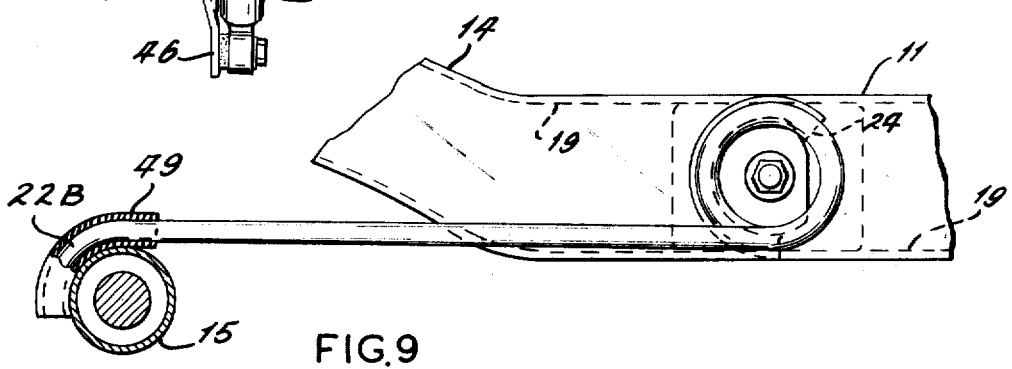
FIG. 9 is a further modification of the present device.

A further modification is seen in FIG. 9 where the arm 22 of the device 18 is formed with a hooked portion 22B encased in a resilient sleeve bushing 49. The portion 22B is engaged over the axle housing 15 so that its working reaction is limited mainly to resisting downward movement of the frame 11. However, by rotating the coil 21 in a counterclockwise direction an initial down load may be placed on the arm 22 to lift the frame 11 above its normal static position.

It is understood, of course, that the eye bolt 40 of FIG. 8 may be used in place of the U bolt 33 of FIG. 3, and the shank 45 may be lengthened to provide a degree of initial load on the arm 22 if desired. Other parts of the respective assemblies may be used interchangeably where necessary to effect installation on various types of vehicle axle and frame constructions.

Figure 10:
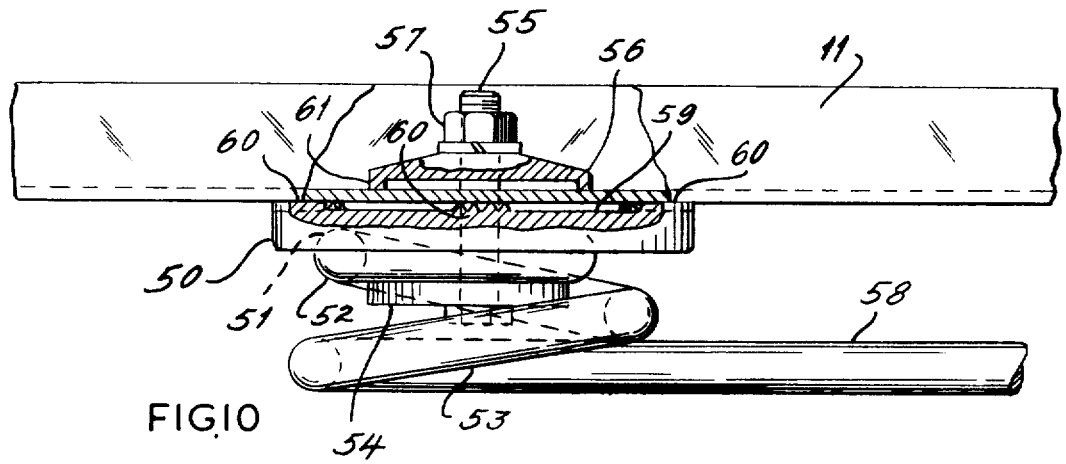
FIG. 10 is a fragmentary sectional view of yet another form of mounting means for the control device.

Turning now to FIG. 10, a further modification is seen wherein the channel frame member 11 is provided with a base cup 50 having a circular recess 51 in its outer surface for the base coil 52 of the spring coil 53. The base coil 52 is clamped in its recess 51 by plate 54 and a center bolt 55 which extends through an aperture in the frame member 11 and is secured by a blacking plate 56 and securing nut 57. The working arm 58 of the control device extends outwardly from the coil 53 along side the frame member 11, as heretofore described in FIGS. 1 and 2, and its end portion (not shown) may be anchored in accordance with any of the means seen in FIGS. 2, 8 or 9.

The features of FIG. 10 that are important reside in the means to prevent rotation of the base cup 50. In this arrangement the base cup 50 is formed with a recess 59 in its rear surface and a plurality (4 being indicated) of toothed projections 60 are formed at spaced intervals around the periphery of the recess 59. The projections 60 are forced to bite into the frame member 11 by the backing plate 56 which is smaller in diameter than the projections 60. The plate 56 is formed with a peripheral edge 61 located within the span of the toothed projections 60, and when the nut 57 is drawn down tight on the plate 56 the wall of the frame member 11 is slightly distorted inwardly of the recess 59 to obtain the desired clamping action for securing the cup 50 against turning.

Figure 11:
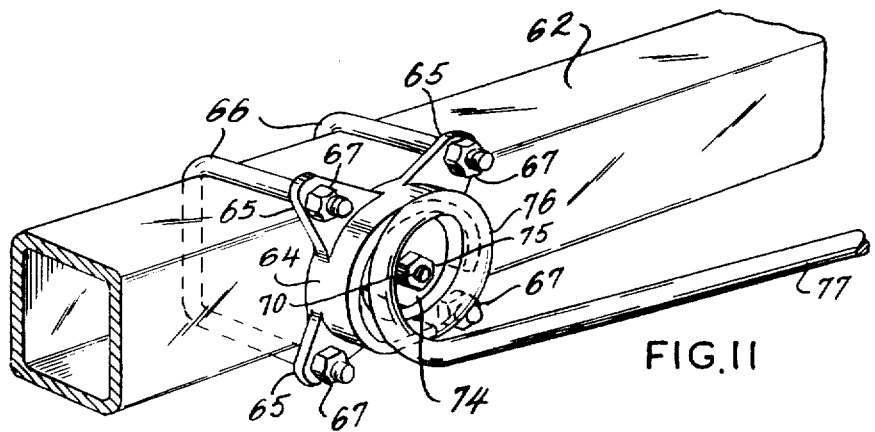
FIG. 11 is a fragmentary perspective view of a vehicle frame with mounting means adapted for a vehicle frame which is not or cannot be drilled.
Figure 12:
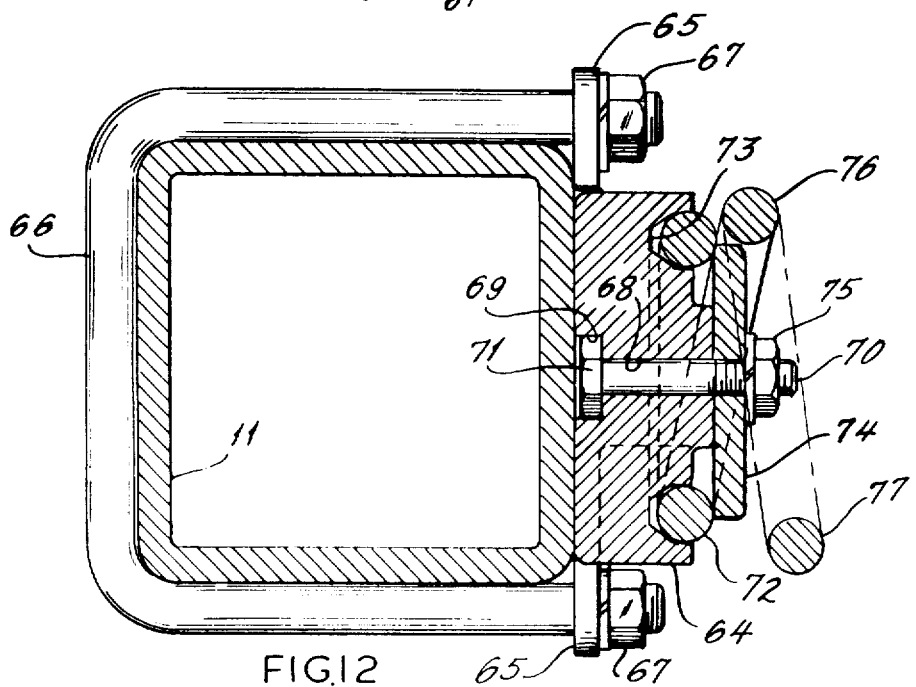
FIG. 12 is a sectional view at line 13—13 in FIG. 12.

In FIGS. 11 and 12 there is illustrated another modification by which the coil of the control device may be secured to a frame member 62 without the center bolt 63 penetrating the frame member. In this assembly a base cup 64 is formed with radially extending ears 65 which clear the frame member 62 to receive U-bolts 66 assembled from the opposite side of the frame member 62. Nuts 67 secure the U-bolts in the respective ears 65, thereby holding the cup 64 against turning. The cup 64 is formed with a central bore 68 and a recess 69 to receive an anchor bolt 70 in non-turning relation. When the cup 64 is secured against the frame member 62 the head 71 of the bolt 70 is held in the recess 69. The base coil 72 is placed in the cup recess 73 and a clamping plate 74 is placed over the coil 72 and secured by a nut 75. The free coil 76 extends outwardly of the plate 74 and is provided with a working arm 77 directed along the frame member 62. The outer end of the arm 77 (not shown) may be connected by any of the means illustrated in other views of the drawings.

The several views of the drawings illustrate various means by which the present control device may be mounted in operative position on a frame member for the purposes enumerated. In each instance it is desired to install the control device in a neutral condition of coil action on the working arm so that for displacement in either direction from this setting the coil will exert a force in opposition to the up or down motion or direction of displacement of the working arm. For other directions of movement of the working arm the arm and the working portion of the spring coil will in combination resist such movement.

What is claimed is:

1. In a vehicle having a frame assembly and an axle assembly and ground engaging wheels carried at the opposite ends of said axle assembly, the improvement of frame stability control devices operatively mounted between said frame assembly and said axle assembly adjacent each wheel, each said device comprising a spring coil connected to one of said assemblies and an elongated arm extending from said coil and connected to the other one of said assemblies, said spring coil having a base portion, a base cup having a seat, and means to clamp said base coil portion in said base cup seat against movement, said spring coil having at least one free coil portion adjacent said base portion, said free coil portion and elongated arm resisting movement between said assemblies.

2. The combination set forth in claim 1 wherein said spring coil is connected to the frame assembly and said arm is engaged with said axle assembly.

3. The combination set forth in claim 1 wherein said base cup is initially adjustable relative to said one assembly for applying selectively a positive or negative load on said elongated arm.

4. The combination set forth in claim 1 wherein said elongated arm is adjustably engaged with said other one of said assemblies.

5. In a vehicle comprising a first component and a second component relatively movable at least toward and away from each other, the improvement of motion control means operatively connected between said vehicle components and including a spring coil connected to the first of said components and an arm extending from said coil, means connecting the extended arm adjacent its end to the second of said components, said connecting means permitting sliding movement of said end relative to said second component, said spring coil including a base coil portion and an active coil portion in a plane at one side of said base coil portion, and means securing said base coil portion to said first component, whereby said active coil portion responds to relative movement of said components by opposing the direction of movement of said arm.

6. The improvement of claim 5 wherein said active coil portion is at least one complete turn and said arm is integral with said active coil portion.

7. The improvement of claim 5 wherein said active coil portion is free standing relative to said base coil portion and resists motion of said arm in directions at an angle to the plane of the active coil portion.

* * * * *